United States Patent
Noh et al.

(10) Patent No.: US 12,003,172 B2
(45) Date of Patent: *Jun. 4, 2024

(54) POWER SUPPLY DEVICE, POWER SUPPLY SYSTEM AND METHOD FOR CONTROLLING THE SAME

(71) Applicant: CSIP CONSULTING LTD., Seoul (KR)

(72) Inventors: Young Seung Noh, Suwon-Si (KR); Kwang Soo Choi, Suwon-Si (KR); Bo Mi Lee, Suwon-Si (KR); Chan Sung Jang, Suwon-Si (KR)

(73) Assignee: CSIP CONSULTING LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,977

(22) Filed: Mar. 10, 2023

(65) Prior Publication Data

US 2023/0208285 A1 Jun. 29, 2023

Related U.S. Application Data

(62) Division of application No. 17/961,174, filed on Oct. 6, 2022, now Pat. No. 11,658,566, which is a division (Continued)

(30) Foreign Application Priority Data

Oct. 31, 2013 (KR) .................. 10-2013-0131602

(51) Int. Cl.
*H02M 3/335* (2006.01)
*H02M 3/04* (2006.01)
(Continued)

(52) U.S. Cl.
CPC .......... *H02M 3/04* (2013.01); *H02M 3/33507* (2013.01); *G06F 1/26* (2013.01); *H02M 1/0025* (2021.05)

(58) Field of Classification Search
CPC ............. H02M 1/0009; H02M 1/0025; H02M 1/0045; H02M 1/0048; H02M 1/34;
(Continued)

(56) References Cited

U.S. PATENT DOCUMENTS 5,886,424 A 3/1999 Kim
6,452,362 B1 9/2002 Choo
(Continued)

FOREIGN PATENT DOCUMENTS

CN 1175721 A 3/1998
CN 1282010 A 1/2001
(Continued)

OTHER PUBLICATIONS

Korean Office Action dated Jan. 31, 2020 in corresponding Korean Patent Application No. 10-2019-0060573 (7 pages in Korean).
(Continued)

*Primary Examiner* — Thienvu V Tran
*Assistant Examiner* — Shahzeb K Ahmad
(74) *Attorney, Agent, or Firm* — NSIP Law

(57) ABSTRACT

A power supply system may include a target device and an adapter. The target device may include an adapter connection switch that receives adapter recognition information to form a connection with the adapter, a voltage detection unit that receives an output voltage from an adapter, and a voltage-change-requesting unit that outputs a voltage to request a voltage change based on information on the output voltage from the adapter. The adapter may include a device information recognition unit that receives the voltage to request a voltage change, and an output-voltage-changing
(Continued)

unit that changes the output voltage based on the voltage to request a voltage change.

12 Claims, 10 Drawing Sheets

Related U.S. Application Data of application No. 14/273,444, filed on May 8, 2014, now Pat. No. 11,515,783.

(51) Int. Cl.
*G06F 1/26* (2006.01)
*H02M 1/00* (2006.01)

(58) Field of Classification Search
CPC .......... H02M 3/04; H02M 3/10; H02M 3/157; H02M 3/335; H02M 3/33507; G06F 1/266; G06F 1/26
See application file for complete search history.

(56) References Cited

U.S. PATENT DOCUMENTS

| | | | |
|---|---|---|---|
| 7,375,492 B2 | 5/2008 | Calhoon et al. | |
| 7,378,817 B2 | 5/2008 | Calhoon et al. | |
| 7,459,886 B1 * | 12/2008 | Potanin | H02J 7/0068 320/135 |
| 8,358,100 B2 | 1/2013 | Helfrich | |
| 2003/0172312 A1 | 9/2003 | Takahashi et al. | |
| 2008/0218130 A1 | 9/2008 | Guo et al. | |
| 2009/0001937 A1 | 1/2009 | Densham et al. | |
| 2010/0064148 A1 * | 3/2010 | Ho | H02J 1/00 713/300 |
| 2010/0077237 A1 * | 3/2010 | Sawyers | G06F 1/26 713/300 |
| 2010/0231185 A1 | 9/2010 | Yu et al. | |
| 2010/0293302 A1 | 11/2010 | Fujii et al. | |
| 2011/0260689 A1 | 10/2011 | Kano | |
| 2012/0206947 A1 | 8/2012 | Haight et al. | |
| 2012/0212078 A1 | 8/2012 | Lanni | |
| 2013/0019113 A1 * | 1/2013 | Yamaya | G06F 1/266 713/300 |
| 2013/0313903 A1 | 11/2013 | Kayama | |
| 2014/0312691 A1 | 10/2014 | Doljack et al. | |
| 2014/0368159 A1 | 12/2014 | Han et al. | |

FOREIGN PATENT DOCUMENTS

| | | | |
|---|---|---|---|
| CN | 101604858 A | 12/2009 | |
| CN | 101604860 A | 12/2009 | |
| CN | 102055223 A | 5/2011 | |
| CN | 102570546 A | 7/2012 | |
| CN | 102684512 A | 9/2012 | |
| EP | 1 691 252 A1 | 8/2006 | |
| EP | 2 381 571 A2 | 10/2011 | |
| JP | 2003-263245 A | 9/2003 | |
| JP | 2004-78740 A | 3/2004 | |
| JP | 2010-267221 A | 11/2010 | |
| JP | 2013-25345 A | 2/2013 | |
| KR | 10-0645770 B1 | 11/2006 | |
| KR | 10-2007-0006969 A | 1/2007 | |
| KR | 10-2009-0031085 A | 3/2009 | |
| KR | 10-2012-0130794 A | 12/2012 | |
| WO | WO 2010/039656 A1 | 4/2010 | |
| WO | WO-2011068671 A2 * | 6/2011 | .......... G06F 1/3203 |
| WO | WO-2014077978 A1 * | 5/2014 | .............. G06F 1/26 |

OTHER PUBLICATIONS

Chinese Office Action dated Jun. 3, 2020 in corresponding Chinese Patent Application No. 201811301312.0 (12 pages in Chinese).
Chinese Office Action dated Feb. 2, 2021 in counterpart Chinese Application No. 201811301312.0 (12 pages in Chinese).
Korean Notice of Allowance dated Jul. 2, 2021 in counterpart Korean Patent Application No. KR 10-2020-0135599 (2 pages in Korean).
Korean Office Action dated Nov. 29, 2021, in counterpart Korean Patent Application No. 10-2021-0092759 (8 pages in Korean).

* cited by examiner

POWER SUPPLY DEVICE, POWER SUPPLY SYSTEM AND METHOD FOR CONTROLLING THE SAME

CROSS-REFERENCE TO RELATED APPLICATIONS

This application is a continuation of U.S. application Ser. No. 17/961,174 filed on Oct. 6, 2022, which is a continuation of U.S. application Ser. No. 14/273,444 filed on May 8, 2014, now U.S. Pat. No. 11,515,783, which claims the benefit of Korean Patent Application No. 10-2013-0131602 filed on Oct. 31, 2013, with the Korean Intellectual Property Office, the entire disclosures of which are incorporated herein by reference.

BACKGROUND

The present disclosure relates to a power supply system including a general-purpose power supply device.

Recently, portable electronic devices have tended to be operated systemically and wirelessly, to provide multimedia services, and to be digitalized, "smart" and relatively complex. In particular, multimedia services are increasingly attracting popular interest, and accordingly, multimedia services provided by small, portable devices have come to prominence.

Among portable electronic devices, as mobile devices such as smartphones and tablet personal computers (PCs) are prominent as information technology devices, new technology requirements for driving power supplying devices such as adapters for charging batteries in such mobile devices have also been increased.

Previously, only the standby power of driving power supply devices has been specified. However, as many features, including touchscreens, have been added to mobile devices, it has become necessary to reduce the influence of such device elements on mobile devices while driving power supply devices are charging such mobile devices.

As mobile devices are diversified in terms of the available types thereof, it is necessary to supply power to different mobile devices having different power specifications using a single power supply device. Accordingly, research into a power supply devices applicable to different mobile devices ongoing.

That is, different mobile devices have different rated voltages, and thus require dedicated power supply devices. For this reason, not to mention the cost burden, users have to carry as many power supply devices as they do mobile devices.

As a solution to solve such problems, setting a common input voltage for mobile devices at, 5 V, for example, may be contemplated. In such a solution, however, a laptop computer, for example, may require a high level of input power and thus consume a large amount of current, such that a separate heat dissipation device may be required to dissipate heat generated in the device.

In such a case, the volume of the power supply device is inevitably increased along with manufacturing costs thereof.

In the case that output voltage from the power supply device is set to be 12 V, even though the current may be decreased, it may force devices (such as smartphones) that have low input voltage and employ small and cheap elements to employ elements having higher withstand voltage levels to handle the increased input voltage. This results in an increase in manufacturing costs, as elements having higher withstand voltages are generally more expensive than elements having lower withstand voltages. Therefore, it may be difficult to use a power supply device that supplies power having a single voltage level to various devices.

Patent Documents 1 and 2 listed below relate to a unified power supply device. However, such a unified power supply device includes power supply circuits for supplying various levels of voltage, so that the volume of the device is increased and thus manufacturing costs are increased.

Therefore, in order to overcome the above problems, a novel power supply device is required that can be used for various devices.

RELATED ART DOCUMENT (Patent Document 1) Korean Patent Laid-Open Publication No. 2009-0031085
(Patent Document 2) Korean Patent Laid-Open Publication No. 2007-0006969

SUMMARY

An aspect of the present disclosure may provide a general-purpose power supply system that can be used for a variety of devices requiring driving power having different voltage and current levels.

According to an aspect of the present disclosure, a power supply system may include: a target device and an adapter, the target device including an adapter connection switch that receives adapter recognition information to form a connection with the adapter, a voltage detection unit that receives an output voltage from the adapter, and a voltage-change-requesting unit that outputs a signal to request a voltage change based on information on the output voltage from the adapter; and the adapter including a device information recognition unit that receives the signal to request a voltage change, and an output-voltage-changing unit that changes the output voltage based on the signal to request a voltage change.

The voltage-change-requesting unit in the target device may be connected to the device information recognition unit in the adapter via a USB data cable.

The adapter may further include an adapter information output unit that outputs adapter information to the target device.

The target device may further include a control unit operably connected to the adapter connection switch, the voltage detection unit and the change-requesting unit.

The adapter may further include a control unit operably connected to the device information recognition unit and the output-voltage-changing unit.

The device information recognition unit may include voltage-dividing resistors to detect a level of a voltage in the USB data cable.

According to another aspect of the present disclosure, a power supply system may include a target device and an adapter, the target device including an adapter connection switch that receives adapter recognition information to form a connection with the adapter, a voltage detection unit that receives an output voltage from an adapter, and a voltage-change-requesting unit that outputs a voltage to request a voltage change based on information on the output voltage from the adapter; and the adapter including a device information recognition unit that receives the voltage to request a voltage change, and an output-voltage-changing unit that changes the output voltage based on the voltage to request a voltage change.

The voltage-change-requesting unit in the target device may be connected to the device information recognition unit in the adapter via a USB data cable, and the device information recognition unit may include voltage-dividing resistors to detect a level of a voltage in the USB data cable.

According to another aspect of the present disclosure, a method for controlling a power supply system may include: determining whether a device is connected at a first time point and at a second time point; determining a specification for supplying power based on whether the device is connected at the first time point and on whether the device is connected at the second time point; and supplying power based on the specification for supplying power.

The determining of the specification for supplying power may include: receiving the signal to request a voltage change to change the specification for supplying power, if it is determined that the device is connected at the first time point and that the device is disconnected at the second time point.

The determining of the specification for supplying power may include: maintaining the specification for supplying power, if it is determined that the device is connected at the first time point and that the device is connected at the second time point.

According to another aspect of the present disclosure, a power supply device may include: a USB data cable; a device information recognition unit that includes voltage-dividing resistors and receives a signal to request a voltage change from a target device via the USB data cable; and an output-voltage-changing unit that changes an output voltage based on the signal to request a voltage change.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
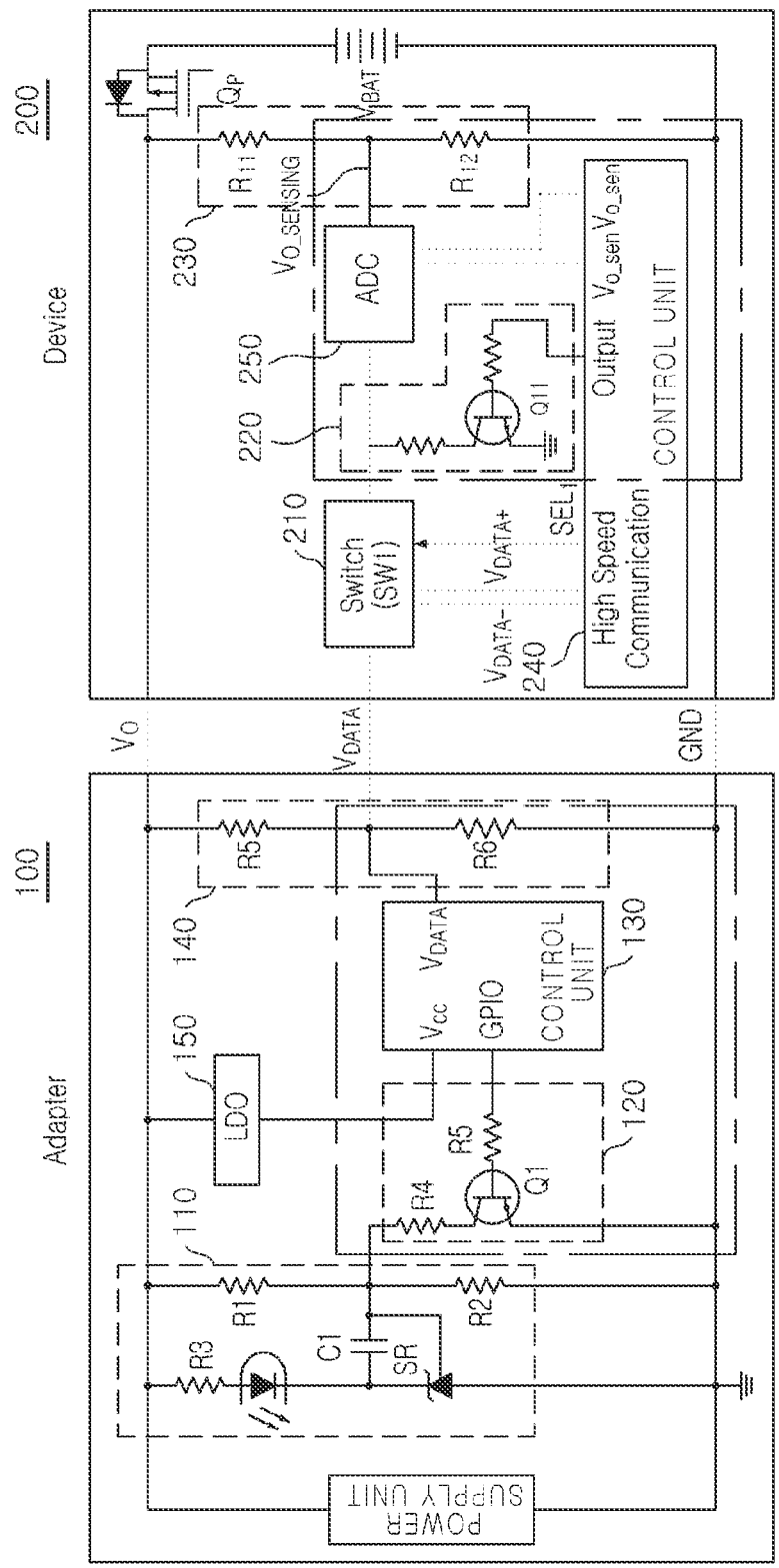
FIG. 1 is a diagram of a power supply system according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

FIG. 1 is a diagram of a power supply system according to an exemplary embodiment of the present disclosure.

Referring to FIG. 1, the power supply system may include an adapter 100, and a target device 200.

The target device 200 may be an electronic device which receives power from the adapter 100 to charge a battery therein.

The target device 200 may include an adapter connection switch 210, a voltage detection unit 230, a voltage-change-requesting unit 220, a control unit 240, and an analog-to-digital converter (ADC) 250.

The control unit 240 may be operably connected to the adapter connection switch 210, the voltage detection unit 230, the voltage-change-requesting unit 220, and the ADC 250, so that it may control the adapter connection switch 210, the voltage detection unit 230, the voltage-change-requesting unit 220, and the ADC 250.

The adapter connection switch 210 may receive adapter recognition information and may form a connection with an adapter. The adapter recognition information may include information as to whether an adapter is connected to a target device.

That is, if an adapter is connected to a target device, the target device recognizes that the device connected thereto is an adapter and then may switch on the adapter connection switch. For example, the target device may recognize that the connected device is an adapter based on information on a USB data cable.

The voltage detection unit 230 may receive an output voltage from an adapter. The voltage detection unit 230 may include voltage-dividing resistors R11 and R12. The voltage detection unit 230 may detect an output voltage Vo from an adapter divided by the voltage-dividing resistors R11 and R12.

In this manner, the target device may receive the output voltage from the adapter.

The control unit 240 may check whether the output voltage from an adapter is equal to the rated voltage of the target device. If the output voltage from the adapter is equal to the rated voltage of the target device, a pass switch Qp is turned on so that a battery may be supplied with power.

If the output voltage from the adapter is not equal to the rated voltage of the target device, the target device 200 may output a signal to request a voltage change to the adapter 100.

The voltage-change-requesting unit 220 may output the signal to request a voltage change based on the output voltage from the adapter. That is, the voltage-change-requesting unit 220 may output a voltage to request a voltage change based on the output voltage from the adapter.

The voltage-change-requesting unit 220 may include a resistor and a switch Q11. The switch Q11 may be connected between ground and a connection node between the adapter connection switch 210 and the ADC 250. Depending on switching of the switch Q11, the level of the voltage output from the voltage-change-requesting unit may be changed.

The adapter 100 may be connected to the target device 200 via a USB data cable $V_{DATA}$. Further, the voltage-change-requesting unit 220 in the device may be connected to a device information recognition unit 140 in the adapter via the adapter connection switch 210 and the USB data cable $V_{DATA}$.

The voltage-change-requesting unit 220 may output the signal to request a voltage change and the voltage to request a voltage change via the USB data cable $V_{DATA}$.

As described above, in the power supply system according to the exemplary embodiment of the present disclosure, information can be transmitted between the adapter and the target device via the existing USB data cable $V_{DATA}$, without employing any additional signal cable.

The ADC 250 may receive a signal from the voltage detection unit 230 and the adapter connection switch 210 and may transmit it to the control unit.

The adapter 100 may include a power supply unit, an output unit 110, an output-voltage-changing unit 120, a control unit 130, the device information recognition unit 140, and a low-dropout regulator (LDO) 150.

The power supply unit may change input power into driving power having a predetermined voltage level so as to supply it.

The output unit 110 may change the voltage of the power from the power supply unit. The power with changed voltage may be regulated via a voltage regulator SR, in which a reference voltage is set by resistors R1 and R2, and then it is output.

The device information recognition unit 140 may receive a signal to request a voltage change from the target device. Specifically, the device information recognition unit 140 may detect a change in the level of the voltage output from the voltage-change-requesting unit in the target device. In other words, the device information recognition unit 140 may detect a change in the voltage on the USB data cable $V_{DATA}$.

The device information recognition unit 140 may include voltage-dividing resistors R5 and R6. The device information recognition unit 140 may detect the voltage on the USB data cable which has been divided by the voltage-dividing resistors R5 and R6.

The output-voltage-changing unit 120 may change the output voltage based on the signal to request a voltage change.

The output-voltage-changing unit 120 may include resistors R4 and R5 and a switch Q1. The resistor R4 may be connected to the output unit 110 in parallel.

Depending on switching of the switch Q1, the level of the voltage output from the adapter may be changed.

The control unit 130 may be operably connected to the device information recognition unit 140 and to the output-voltage-changing unit and may control the device information recognition unit 140 and the output-voltage-changing unit.

Figure 2:
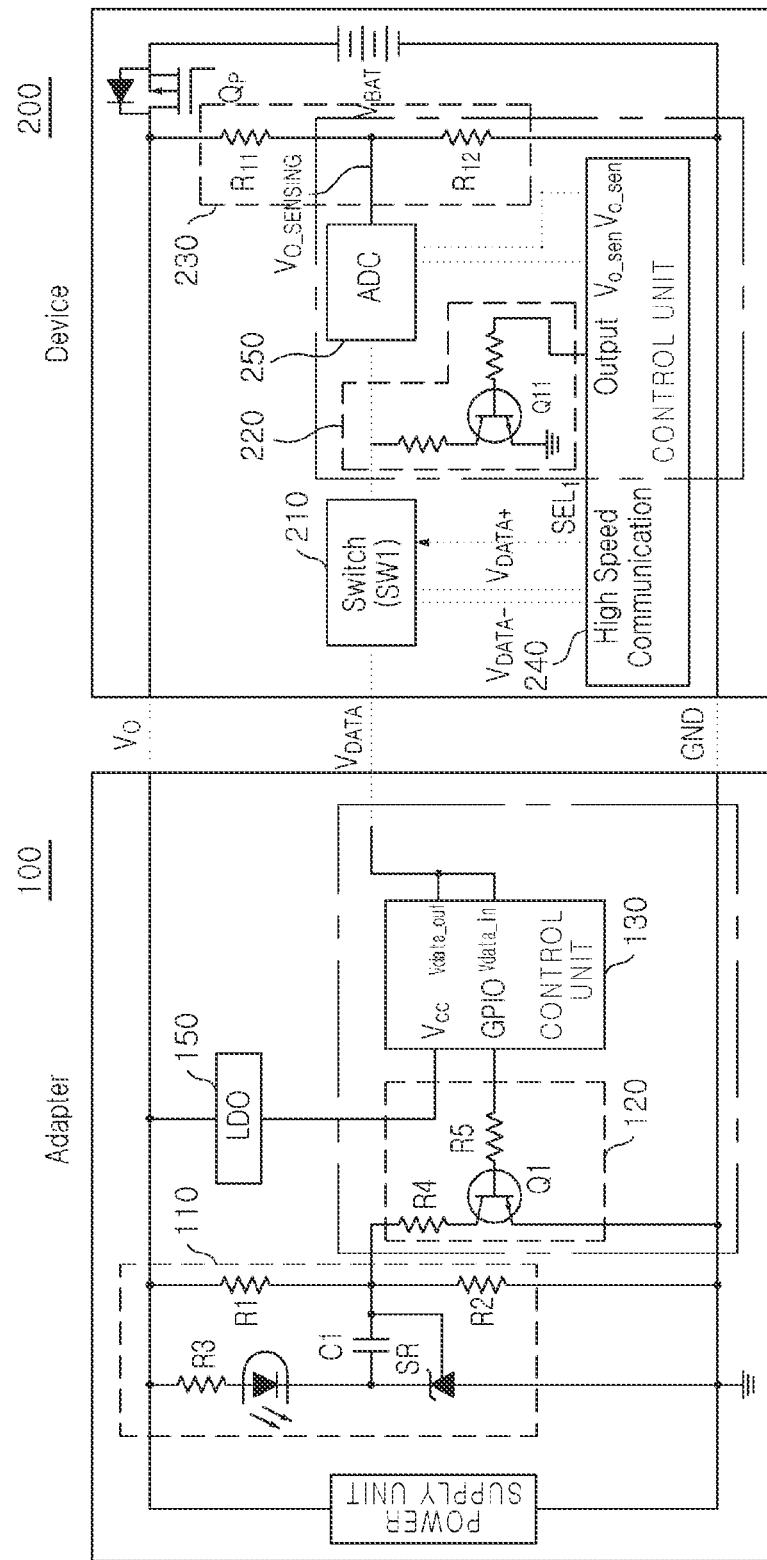
FIG. 2 is a diagram of a power supply system according to another exemplary embodiment of the present disclosure.

FIG. 2 is a diagram of a power supply system according to another exemplary embodiment of the present disclosure.

The power supply system shown in FIG. 2 is identical to the system shown in FIG. 1, except for the control unit 130. Other elements than the control unit 130 have been described above and, therefore, will not be described again.

Referring to FIG. 2, the control unit 130 may replace the device information recognition unit 140 shown in FIG. 1. According to this exemplary embodiment, the resistors used in the device information recognition unit 140 are eliminated, and device information is recognized by resistors in the control unit 130. Therefore, the number of used resistors may be reduced.

Figure 3:
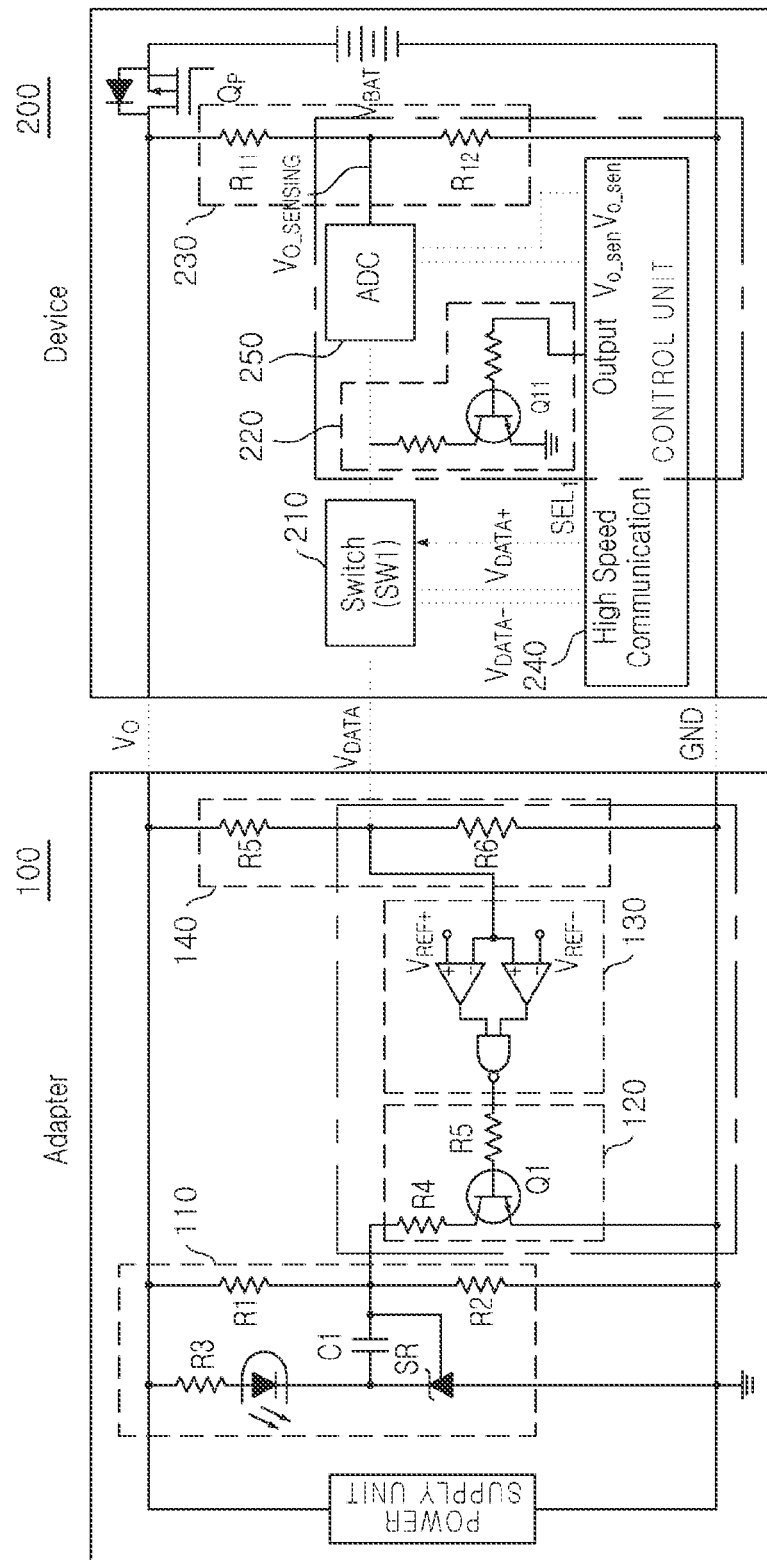
FIG. 3 is a diagram of a power supply system according to another exemplary embodiment of the present disclosure.

FIG. 3 is a diagram of a power supply system according to another exemplary embodiment of the present disclosure.

The power supply system shown in FIG. 3 is identical to the system shown in FIG. 1, except for the control unit 130.

Other elements than the control unit 130 have been described above and, therefore, will not be described again.

The control unit 130 may include a plurality of comparators and a NAND logic circuit. The control unit 130 may output different signals when it receives a voltage within a predetermined range, i.e., $V_{REF-}$ and $V_{REF+}$ and when it receives a voltage out of the predetermined range, i.e., $V_{REF-}$ and $V_{REF+}$.

Accordingly, the control unit 130 may not operate the output-voltage-changing unit 120 while the target device is being supplied with a rated voltage. Further, the control unit 130 may operate the output-voltage-changing unit 120 while the target device is not being supplied with a rated voltage.

Figure 4:
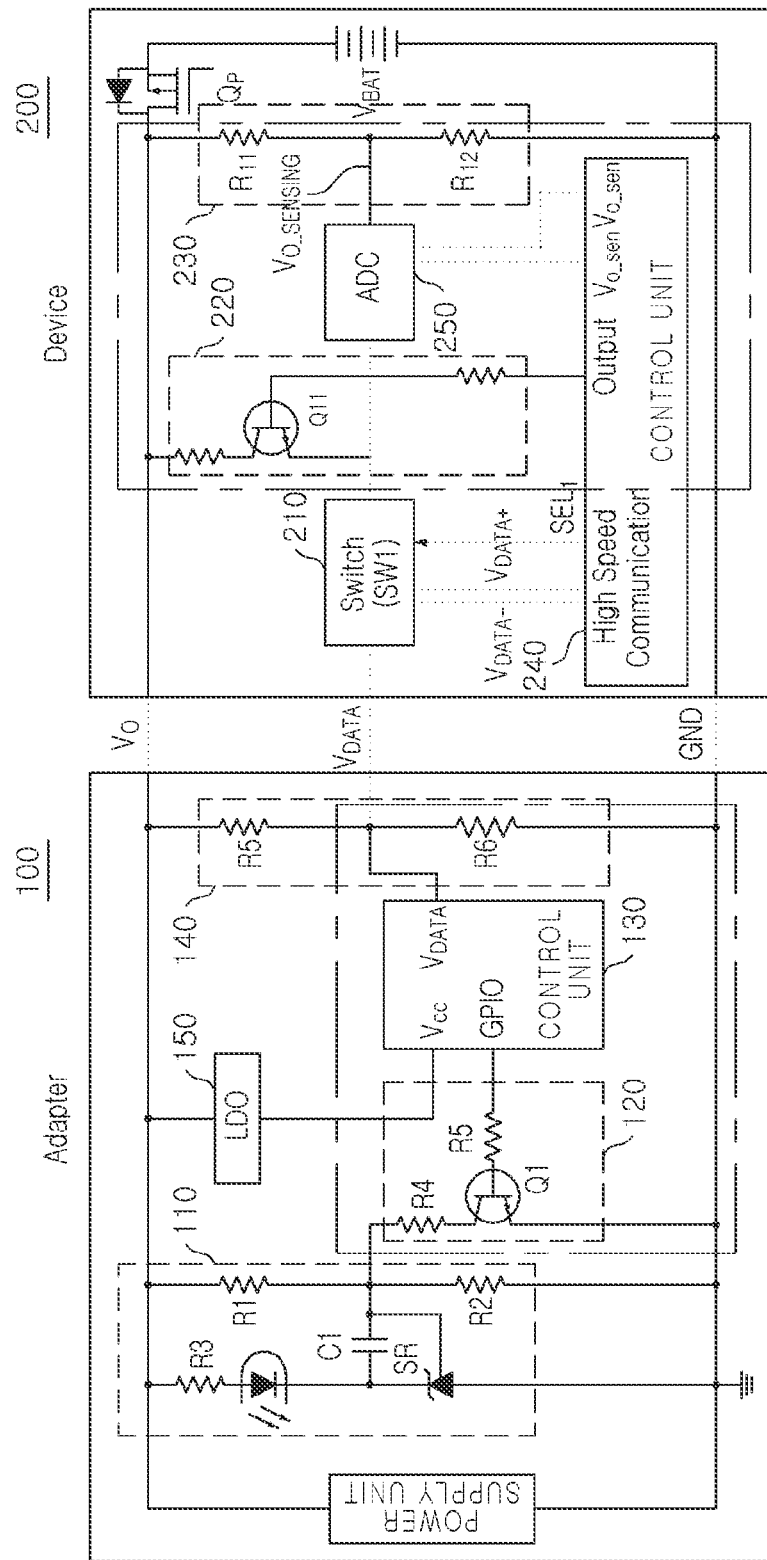
FIG. 4 is a diagram of a power supply system according to another exemplary embodiment of the present disclosure.

FIG. 4 is a diagram of a power supply system according to another exemplary embodiment of the present disclosure.

The power supply system shown in FIG. 4 is identical to the system shown in FIG. 1, except for the voltage-change-requesting unit 220. Other elements than the voltage-change-requesting unit 220 have been described above and, therefore, will not be described again.

The voltage-change-requesting unit 220 may include a resistor and a switch Q11. The switch Q11 may be connected between an output cable Vo and a connection node between the adapter connection switch 210 and the ADC 250. Depending on switching of the switch Q11, the level of the voltage output from the voltage-change-requesting unit may be changed.

Figure 5:
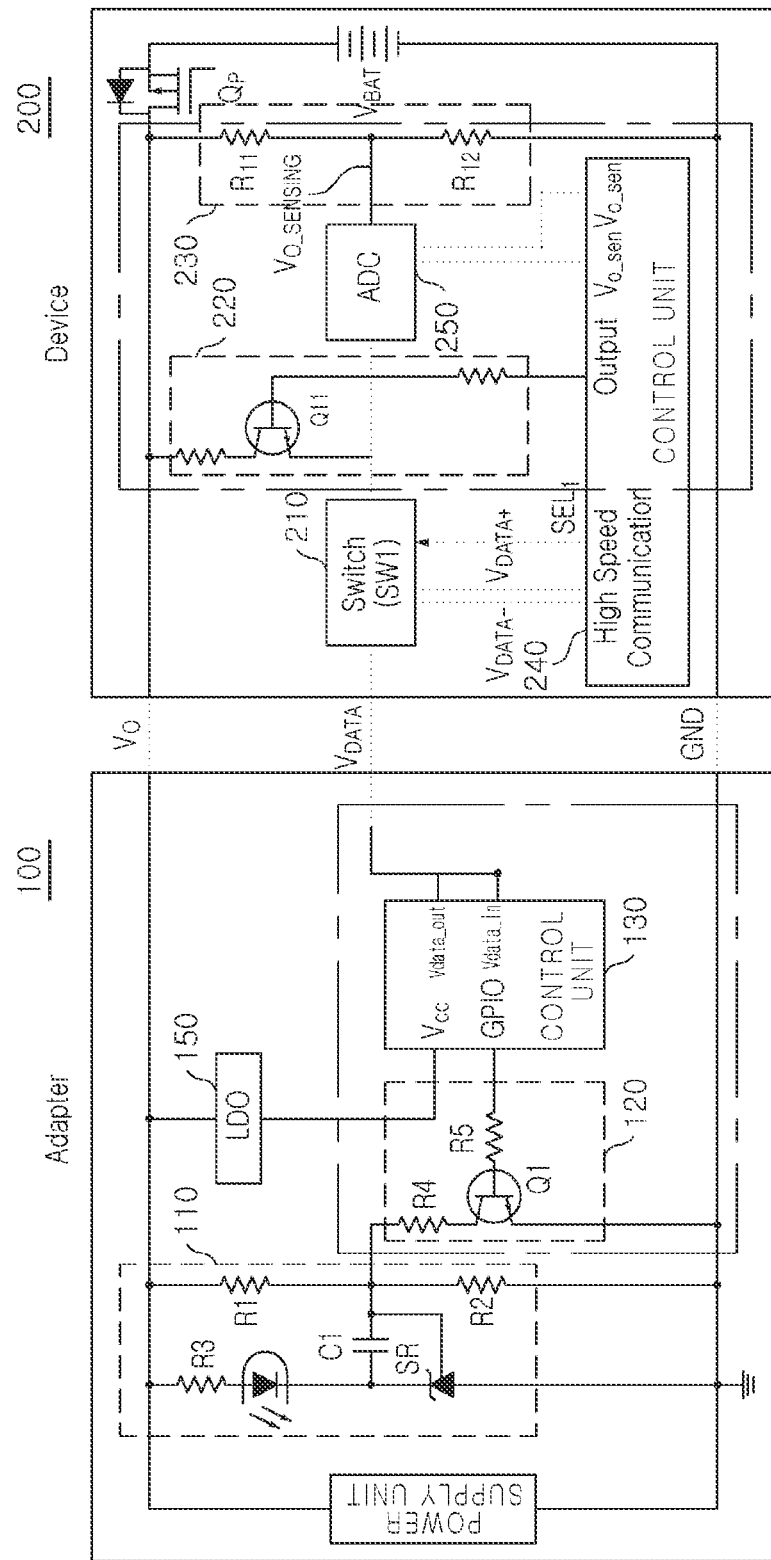
FIG. 5 is a diagram of a power supply system according to another exemplary embodiment of the present disclosure.

FIG. 5 is a diagram of a power supply system according to another exemplary embodiment of the present disclosure.

The power supply system shown in FIG. 5 is identical to the system shown in FIG. 4, except for the control unit 130. Other elements than the control unit 130 have been described above and, therefore, will not be described again.

Referring to FIG. 5, the control unit 130 may replace the device information recognition unit 140 shown in FIG. 4. According to this exemplary embodiment, the resistors used in the device information recognition unit 140 are eliminated, and device information is recognized by resistors in the control unit 130. Therefore, the number of used resistors may be reduced.

Figure 6:
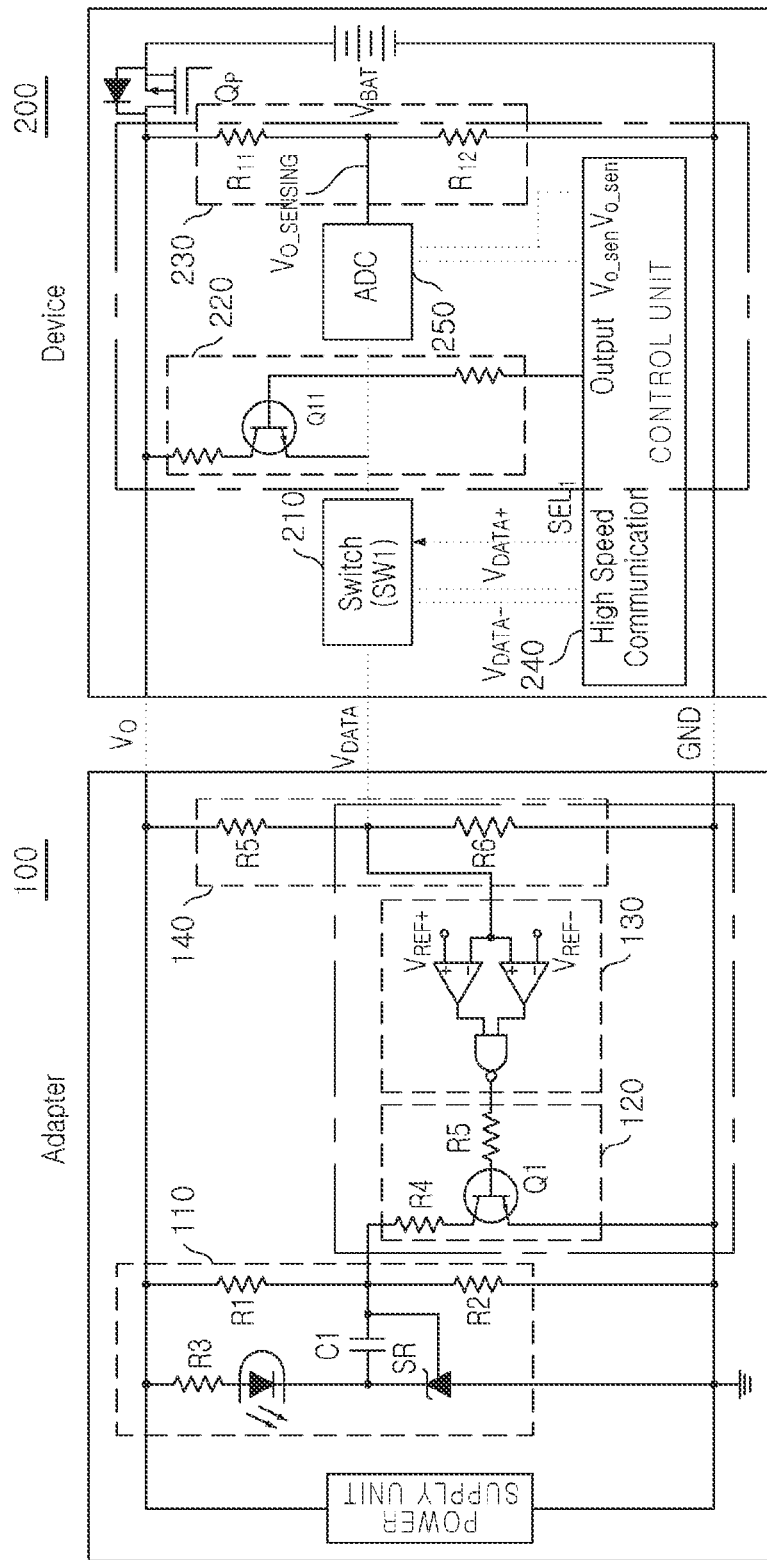
FIG. 6 is a diagram of a power supply system according to another exemplary embodiment of the present disclosure.

FIG. 6 is a diagram of a power supply system according to another exemplary embodiment of the present disclosure.

The configuration of the power supply system shown in FIG. 6 will be apparent to those skilled in the art based on the descriptions given with respect to the FIGS. 1, 2, 3 and 4 and, therefore, will not be described.

Figure 7:
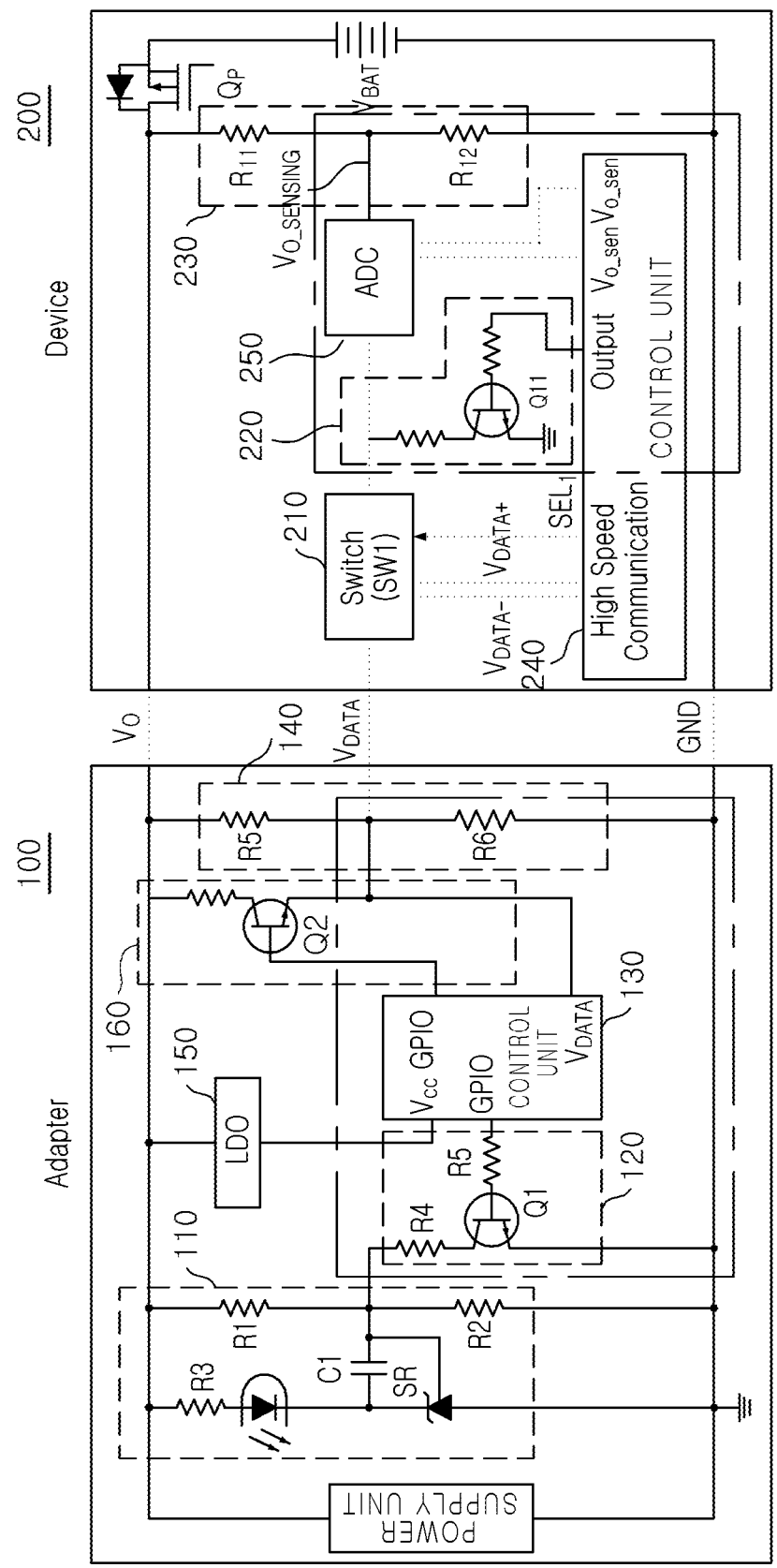
FIG. 7 is a diagram of a power supply system according to another exemplary embodiment of the present disclosure.

FIG. 7 is a diagram of a power supply system according to another exemplary embodiment of the present disclosure.

The power supply system shown in FIG. 7 is identical to the system shown in FIG. 1, except for an adapter information output unit 160. Other elements than the adapter information output unit 160 have been described above and, therefore, will not be described again.

The adapter information output unit 160 may output adapter information to a target device. The adapter information may indicate that the adapter is a variable-output adapter.

When an adapter is connected to a target device, the adapter information output unit 160 may output adapter information to the target device.

The adapter information output unit 160 may include a resistor and a switch Q2. The switch Q2 and the resistor may be connected to each other in series and may be connected to the device information recognition unit 140 in parallel.

Depending on switching of the switch Q2, the level of the voltage on a USB data cable $V_{DATA}$ may be changed.

Accordingly, the adapter information output unit 160 may deliver the adapter information to the target device via the USB data cable $V_{DATA}$.

As described above, in the power supply system according to the exemplary embodiment of the present disclosure, information can be transmitted between the adapter and the target device via the existing USB data cable $V_{DATA}$, without employing any additional signal cable.

Figure 8:
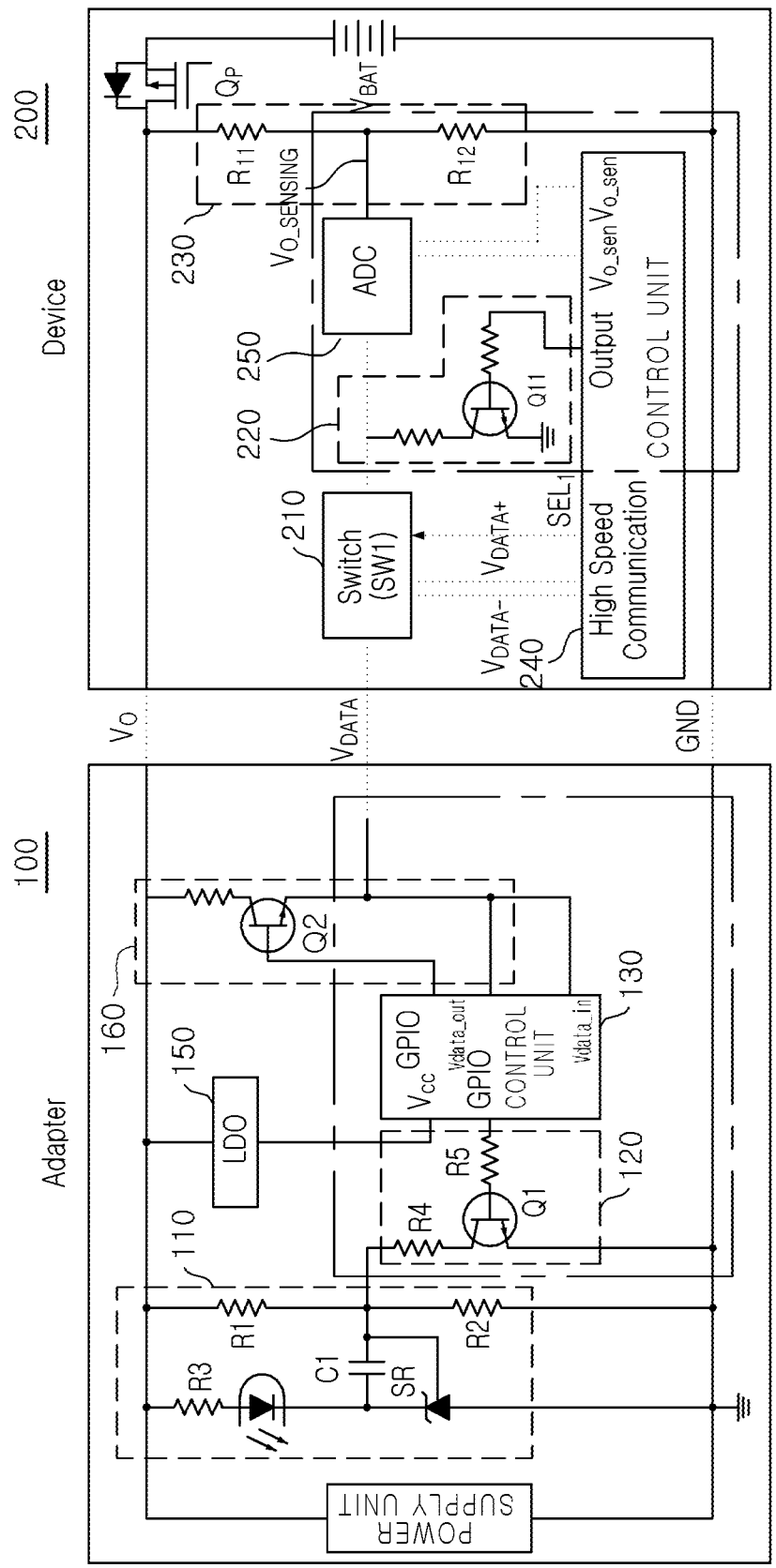
FIG. 8 is a diagram of a power supply system according to another exemplary embodiment of the present disclosure.

FIG. 8 is a diagram of a power supply system according to another exemplary embodiment of the present disclosure.

The power supply system shown in FIG. 8 is identical to the system shown in FIG. 7, except for the control unit 130. Other elements than the control unit 130 have been described above and, therefore, will not be described again.

Referring to FIG. 8, the control unit 130 may replace the device information recognition unit 140 shown in FIG. 7. According to this exemplary embodiment, the resistors used in the device information recognition unit 140 are eliminated, and device information is recognized by resistors in the control unit 130. Therefore, the number of used resistors may be reduced.

In this regard, the control unit 130 shown in FIGS. 1, 2, 4, 5, 7 and 8 may be a controller in the adapter to transmit/receive signals and to change an output voltage.

Further, the control unit 240 shown in FIGS. 1, 2, 4, 5, 7 and 8 may be an IC to implement the inherent function of the device or may be a separate IC to perform voltage detection, voltage-change request or the like, as described above.

The control unit 130 shown in FIGS. 3 and 6 may be implemented in an analog manner and may diversify output voltage by adding circuits such as a comparator, a logic gate, a flip-flop and the like if more voltages are required by the device.

Figure 10:
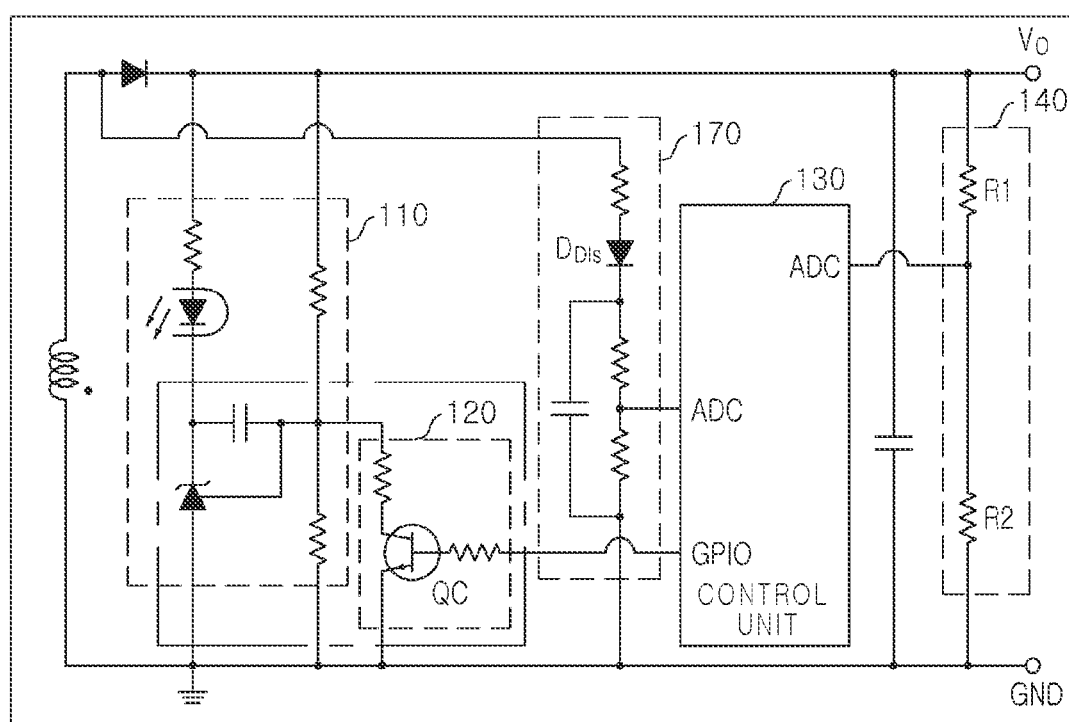
FIG. 10 is a circuit diagram of an adapter according to another exemplary embodiment of the present disclosure.

FIG. 10 is a circuit diagram of an adapter according to another exemplary embodiment of the present disclosure.

The adapter shown in FIG. 10 is identical to the adapter shown in FIG. 1, except for a disconnection-detecting unit 170. Other elements than the disconnection-detecting unit 170 have been described above and, therefore, will not be described again.

The disconnection-detecting unit 170 may include a diode $D_{DIS}$, resistors and a capacitor.

The level of the average input voltage of the diode $D_{DIS}$ may be different depending on the state of a target device. Depending on the state of the device, the duty cycle of and frequency of a DC/DC converter are changed, and accordingly the average input voltage of the diode $D_{DIS}$ may be changed.

After the average input voltage is rectified by the diode $D_{DIS}$, it is filtered by the capacitor having small capacitance, and then a DC value reflecting the state of a load may be detected. By using this value, disconnection of the device can be detected.

Figure 9:
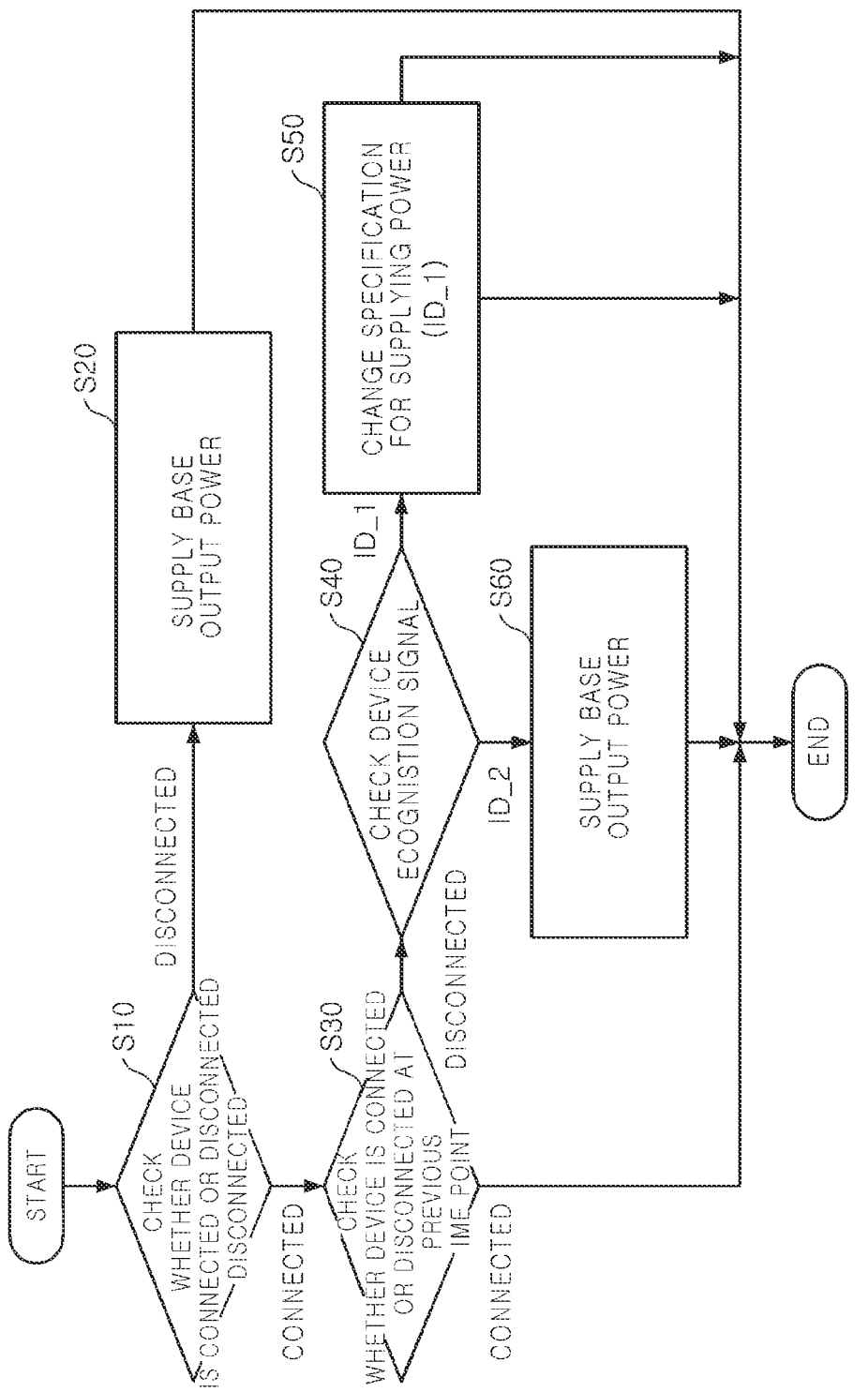
FIG. 9 is a flowchart for illustrating a method for controlling a power supply system according to an exemplary embodiment of the present disclosure.

FIG. 9 is a flowchart for illustrating a method for controlling a power supply system according to an exemplary embodiment of the present disclosure.

Referring to FIG. 10, the adapter may check whether the device is disconnected therefrom (S10). In doing so, the disconnection-detecting unit 170 shown in FIG. 9 may be used.

If it the adapter is disconnected from the device, the adapter may output base output power (S20).

If the adapter is connected to the device, the adapter may check whether the adapter was disconnected from the device at a previous time point (S30).

That is, according to the method for controlling a power supply system according to the exemplary embodiment of the present disclosure, it may be determined whether the device is connected to the adapter at first and second time points. The second time point is earlier than the first time point.

If the adapter is connected to the device at the first time point and at the second time point, the adapter does not change its output voltage.

In the related art, while an adapter supplies power to a device after they are connected to each other and mutually check recognition signals, the recognition signals may be distorted due to a change in the state of the device or introduction of noise. When this happens, the adapter may supply power to the device based on the erroneously recognized signal. At this time, an error occurs in the device and the device may be damaged, unless a separate protection circuit is operated in the device.

In the method for controlling a power supply system according to the exemplary embodiment of the present disclosure, however, it is determined whether the device is connected at the first time point and the second time point, and then it is determined whether to change the output power. Therefore, the specification for supplying power is not changed, even if distortion in a recognition signal or a reception error occurs, until a previously connected device is disconnected from an adapter and then another device having different specification is connected to the adapter. Additionally, damage to the device due to excessive power supplied thereto can be prevented.

If the adapter is connected to the device at the first time point and is disconnected from the device at the second time point, the adapter may detect a device recognition signal (S40). The device recognition signal refers to the signal to request a voltage change, which is described above.

According to an exemplary embodiment of the present disclosure, the adapter may change the specification for supplying power based on the device recognition signal (S50 and S60).

According to the method for controlling a power supply system, errors in supplying power caused by erroneously recognizing signals can be reduced. Further, according to the method for controlling a power supply system, operational stability of a general-purpose power supply device can be improved.

In addition, the method for controlling a power supply system according to the exemplary embodiment does not require any additional cable and thus can save cost.

As set forth above, according to exemplary embodiments of the present disclosure, a general-purpose power supply system that can be used for a variety of devices having different voltage and current levels of driving power can be provided.

While exemplary embodiments have been shown and described above, it will be apparent to those skilled in the art that modifications and variations could be made without departing from the spirit and scope of the present disclosure as defined by the appended claims.

What is claimed is:

1. A power supply device to be connected to a power receiving device, the power supply device comprising:
   a power supply means for changing an input power into an output voltage;
   a voltage port for supplying the output voltage to the power receiving device;
   a ground port for matching a ground potential of the power receiving device with the power supply device;
   a control port for receiving a request signal, from the power receiving device, for determining an output voltage specification and sending a device information signal to the power receiving device, the control port being provided separately from the voltage port;

a control means for controlling the power supply means based on the request signal so as to determine the output voltage specification and provide the output voltage to the voltage port; and device information output means for providing the device information signal indicating a type of the power supply device to the power receiving device through the control port, wherein the type of the power supply device indicates that the power supply device is an output-voltage variable device, and wherein, the voltage port, the ground port, and the control port are universal serial bus (USB) ports configured to be connected to a USB connector.

2. The power supply device of claim 1, wherein the device information output means includes a register and a switch connected to each other in series, and wherein the switch selectively connects the register to the control port.

3. The power supply device of claim 1, the control means comprising:

a control unit configured to generate a control signal based on the request signal input through the control port; and an output unit configured to provide a feed-back to the power supply unit for determining the output voltage specification based on the control signal.

4. The power supply device of claim 1, wherein the power supply device further includes a device information recognition means for detecting the request signal based on a voltage level of the control port.

5. A power receiving device to be connected to a power supply device, the power receiving device comprising:

a voltage port for receiving an output voltage from the power supply device;

a ground port for matching a ground potential of the power receiving device with the power supply device;

a control port for receiving a device information signal from the power supply device and transmitting a request signal to the power supply device;

a control means for generating the request signal for requesting an output power specification of the power supply device; and a connection switch configured to operably connect the control port to the control means so as to receive the device information signal from the power supply device through the control port and form a connection with the power supply device to send the request signal through the control port;

wherein the voltage port, the ground port, and the control port are universal serial bus (USB) ports to be connected to a USB connector, and wherein the control port is provided separately from the voltage port.

6. The power receiving device of claim 5, wherein the device information signal represents capability of the power supply device.

7. The power receiving device of claim 6, wherein the control means generates the request signal reflecting the device information signal.

8. The power receiving device of claim 6, further comprising a voltage detection means for detecting the output voltage supplied through the voltage port.

9. The power receiving device of claim 8, further comprising:

a battery; and a pass switch configured to selectively transmit the output voltage to the battery, wherein the control means is configured to turn on the pass switch in such a manner that the input voltage is transmitted to the battery when the output voltage, detected by the voltage detection unit, is the same as the rated voltage of the receiving device.

10. The power receiving device of claim 8, wherein the voltage detection means comprises voltage-dividing resistors having a first register and a second register, wherein the first register is coupled to the voltage port, and the second register is coupled to the ground port.

11. The power receiving device of claim 5, wherein the device information signal indicates that the power supply device is an output-voltage variable device.

12. The power receiving device of claim 5, wherein the control means comprises:

a control unit configured to generate a control signal for determining the output voltage specification; and a voltage-change-requesting unit configured to output the request signal to the power supply device through the control port, based on the control signal.

* * * * *